(12) United States Patent
Bucheton et al.

(10) Patent No.: US 7,854,411 B2
(45) Date of Patent: Dec. 21, 2010

(54) AIRCRAFT UNDERCARRIAGE INCLUDING A PLURALITY OF ELECTROMECHANICAL ACTUATORS, AND A METHOD OF TESTING IT

(75) Inventors: Daniel Bucheton, Le Chesnay (FR); François-Noël Leynaert, Montmorency (FR); Marc Quenerchdu, Paris (FR)

(73) Assignee: Messier-Bugatti, Velizy Villacoublay (FR)

( * ) Notice: Subject to any disclaimer, the term of this patent is extended or adjusted under 35 U.S.C. 154(b) by 907 days.

(21) Appl. No.: 11/507,463

(22) Filed: Aug. 22, 2006

(65) Prior Publication Data
US 2007/0241230 A1    Oct. 18, 2007

(30) Foreign Application Priority Data
Apr. 12, 2006    (FR)    ................... 06 03229

(51) Int. Cl.
*B64C 25/50*    (2006.01)
(52) U.S. Cl. .................................. 244/103 R
(58) Field of Classification Search ............. 244/102 R, 244/103 R, 100 R; 74/424.81, 424.82, 424.83; 192/76, 83 C
See application file for complete search history.

(56) References Cited

U.S. PATENT DOCUMENTS 2,906,143 A * 9/1959 Walton ........................ 74/640
3,954,232 A * 5/1976 Harper ................... 244/102 R
4,575,027 A * 3/1986 Cronin .................... 244/99.12
4,730,788 A * 3/1988 Metcalf et al. ................ 244/50
5,086,994 A    2/1992 Donnelly et al.
5,360,185 A    11/1994 Derrien

FOREIGN PATENT DOCUMENTS

FR    2677951 A    12/1992

OTHER PUBLICATIONS

Patent Abstracts fo Japan vol. 015, No. 134(M-1099) Apr. 3, 1991 & JP 03016896 A (Mitsubishi Heavy Ind Ltd) Jan. 24, 1991.

* cited by examiner

*Primary Examiner*—Tien Dinh
(74) *Attorney, Agent, or Firm*—Sughrue Mion, PLLC

(57) ABSTRACT

The invention relates to an aircraft undercarriage including a steerable bottom portion and a steering member suitable for turning the steerable bottom portion in response to a steering order. According to the invention, the steering member comprises a plurality of electromechanical steering actuators each having at least one main electric motor, and the actuators are disposed on the undercarriage so as to enable all of them to co-operate simultaneously with the steerable bottom portion in order to steer it, each of the electro-mechanical steering actuators including controllable coupling means for selectively placing the actuator either in a coupled state in which it is coupled with the steerable bottom portion , in which the main electric motor of the actuator is suitable for causing the steerable bottom portion to turn; or else in an uncoupled state in which it is uncoupled from the steerable bottom portion and in which the main electric motor of the actuator is isolated from the steerable bottom portion.

9 Claims, 4 Drawing Sheets ively placing the actuator:
AIRCRAFT UNDERCARRIAGE INCLUDING A PLURALITY OF ELECTROMECHANICAL ACTUATORS, AND A METHOD OF TESTING IT The invention relates to an aircraft undercarriage including a plurality of electromechanical steering actuators.

BACKGROUND OF THE INVENTION

Aircraft undercarriages are known that include a bottom portion that is steerable and a steering member adapted to turn the steerable bottom portion in response to a steering order.

The steering member often includes one or more actuators which act on the steerable bottom portion. Other types of steering member are known, e.g. using a rack.

In the field of carrier-borne aircraft, it is known to use steering members that include an actuator with a hydraulic motor co-operating with a toothed ring secured to the steerable bottom portion of the undercarriage.

In the field of light aircraft, it is known to use a steering member including an actuator with an electric motor co-operating with a toothed ring secured to the steerable bottom portion of the undercarriage.

Nevertheless, if the actuator member fails, command over steering is lost completely, and it is no longer possible to direct the aircraft under its own control other than by differential braking or by asymmetrical thrust from its engines.

OBJECT OF THE INVENTION

The invention seeks to improve steering control and to provide new possibilities for use.

BRIEF SUMMARY OF THE INVENTION

In order to achieve this object, the invention provides an aircraft undercarriage including a steerable bottom portion and a steering member suitable for turning the steerable bottom portion in response to a steering order, in which, in accordance with the invention, the steering member comprises a plurality of electro-mechanical steering actuators each comprising at least one main electric motor, and the actuators are disposed on the undercarriage so as to enable all of them to co-operate simultaneously with the steerable bottom portion in order to steer it, each of the electromechanical steering actuators including controllable coupling means for selectively placing the actuator:

either in a coupled state in which it is coupled with the steerable bottom portion, in which the main electric motor of the actuator is suitable for causing the steerable bottom portion to turn; or else in an uncoupled state in which it is uncoupled from the steerable bottom portion and in which the main electric motor of the actuator is isolated from the steerable bottom portion.

Thus, if one of the actuators breaks down, it is decoupled and steering can still be provided by the working actuator.

The aircraft can then be allowed to take off from an airport even if a spare actuator is not available at that airport, thus contributing to making the aircraft easier to operate.

BRIEF DESCRIPTION OF THE DRAWINGS

The invention can be better understood in the light of the following description with reference to the figures of the accompanying drawings, in which.

DETAILED DESCRIPTION OF THE INVENTION

Figure 1:
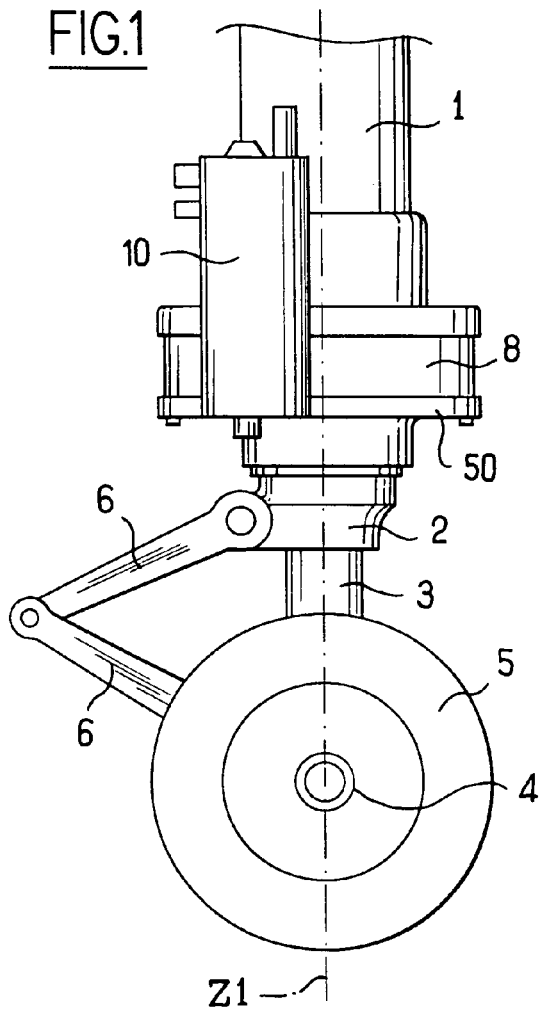
FIG. 1 is a diagrammatic view of the bottom of an undercarriage fitted with electromechanical steering actuators of the invention.
Figure 2:
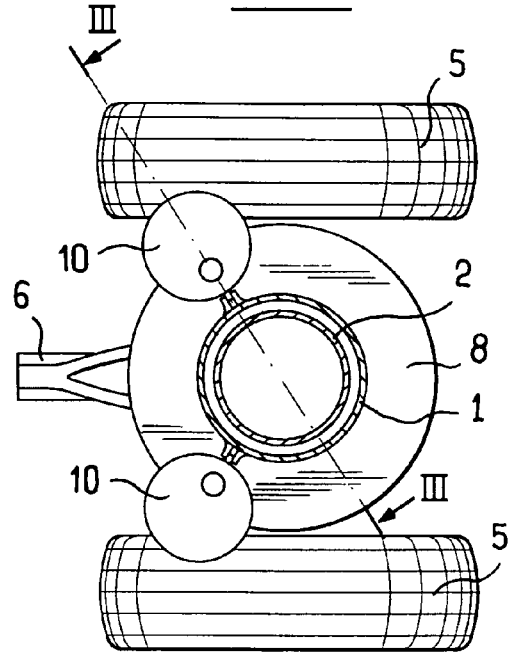
FIG. 2 is a plan view of the FIG. 1 undercarriage.

With reference to FIGS. 1 and 2, and in accordance with a particular embodiment of the invention, the under-carriage shown comprises a main fitting 1, also called cylinder, in which a turnable tube 2 is mounted to turn about a longitudinal axis Z1. A telescopic shock absorber 3 extends inside the turnable tube 2. The bottom portion of the shock absorber projects from the tube 2 and carries an axle 4 that receives wheels 5. A scissors linkage 6 extends between the tube 2 and the shock absorber 3 to constrain the tube 2 to turn with the shock absorber 3 while allowing the shock absorber to shorten freely into the main fitting 1 along the axis Z1.

At its bottom end, the tube 2 carries a toothed ring 7 (shown in FIG. 3) which is received in a housing 8 in the strut 1 and which is constrained to turn with the turnable tube 2 by fluting 9.

In the invention, the undercarriage is fitted with two modular electromechanical steering actuators 10 adapted to co-operate with the toothed ring 7 to turn the tube 2 and thus turn the wheels 5 via the scissors linkage 6. The electromechanical steering actuators 10 in this example form individual modules and they are fitted to corresponding housings 8 in the main fitting 1 so as to be easily removed without that requiring the other electromechanical steering actuator or any other structural portion of the undercarriage to be removed as well.

Figure 3:
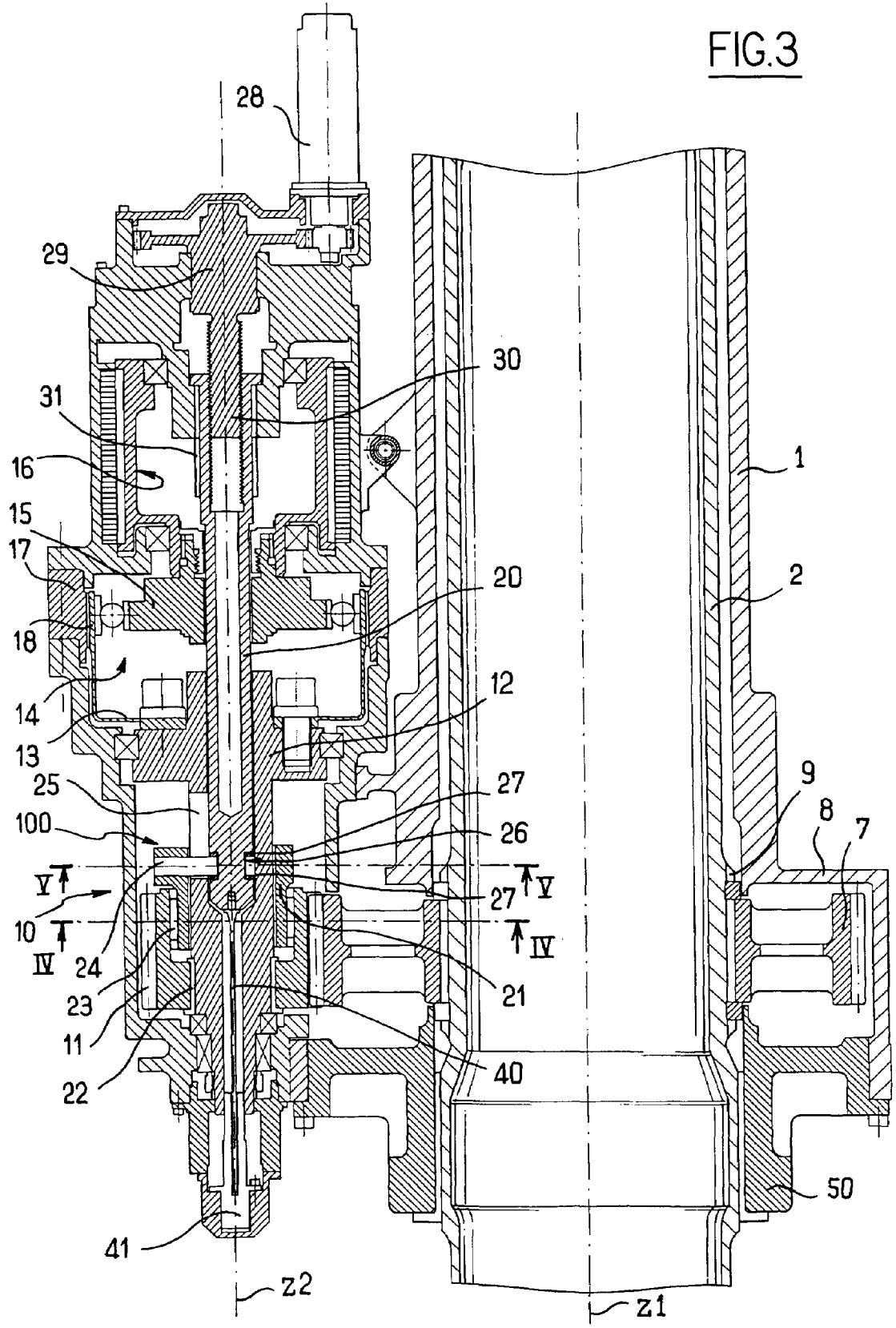
FIG. 3 is a section view through an electro-mechanical steering actuator on line III-III of FIG. 2, the shock absorber being removed, the coupling member being shown in its coupled position.

With reference to FIG. 3, the toothed ring 7 is engaged by an outlet pinion 11 from the electromechanical steering actuator that is mounted to turn relative to the electromechanical steering actuator about an axis Z2 that is parallel to the axis Z1 of the undercarriage. The pinion 11 is connected to a driver 12 via a controllable coupling member 100 that is described in detail below. The driver 12 is secured to the outlet member 13 of a gearbox 14 of the type shown in U.S. Pat. No. 2,906,143, i.e. having a deformable circular wall 18 carrying on its outside face teeth that co-operate with facing teeth of a ring 17, provided in slightly greater number. The cooperation between the teeth of the output member 13 and of the ring 17 is ensured by deforming the circular wall 18 under thrust from the input member 15 of the gearbox, forcing the teeth to co-operate in two diametrically opposite portions. It should be observed that the ring 17 in this example forms a portion of the housing of the electromechanical steering actuator. The remainder of the gearbox is conventional and does not form part of the subject matter of the invention as such.

The input member 15 of the gearbox 14 is turned by a main electric motor 16. Thus, assuming that the coupling member establishes mechanical coupling between the main electric motor 16 and the outlet pinion 11, then controlled rotation of the main electric motor 16 causes the pinion 11 to be turned via the gearbox 14, and thus serves to turn the toothed ring 7.

The coupling member 10 is described below in detail.

Figure 7:
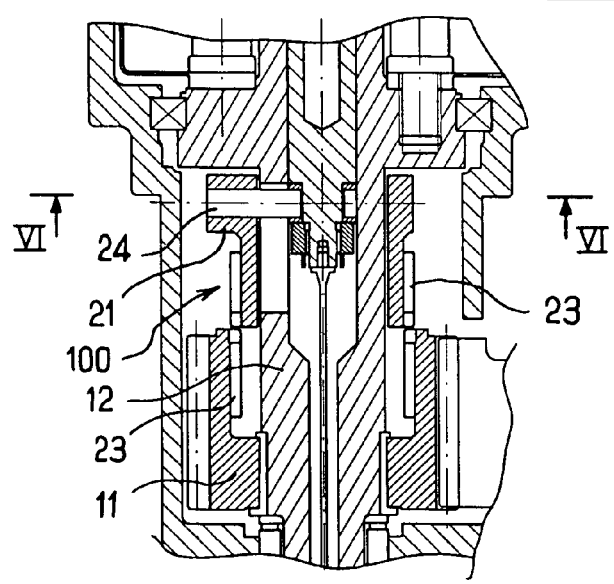
FIG. 7 is a section view analogous to that of FIG. 3 showing the coupling member in the uncoupled state.

The outlet pinion 11 is mounted to rotate freely on the driver 12. The coupling member 100 includes a claw clutch 21 which is movable axially relative to the driver 12 between an engaged position (shown here) in which the clutch 21 extends between the outlet pinion 11 and the driver 12 so as to constrain them to rotate together, and a release position (visible in FIG. 7) in which the clutch releases the outlet pinion 11 so that it is free to turn relative to the driver 12.

Thus, when the clutch 21 is in the engaged position, the main electric motor 16 is mechanically connected to the outlet pinion 11 such that the electromechanical steering actuator is coupled to the toothed ring 7 and can steer the wheels of the undercarriage, whereas when the clutch 21 is in the release position, the main electric motor 16 is no longer mechanically connected with the outlet pinion 11, such that the electromechanical steering actuator is no longer coupled to the toothed ring 7 and can thus no longer steer the wheels of the undercarriage.

Figure 4:
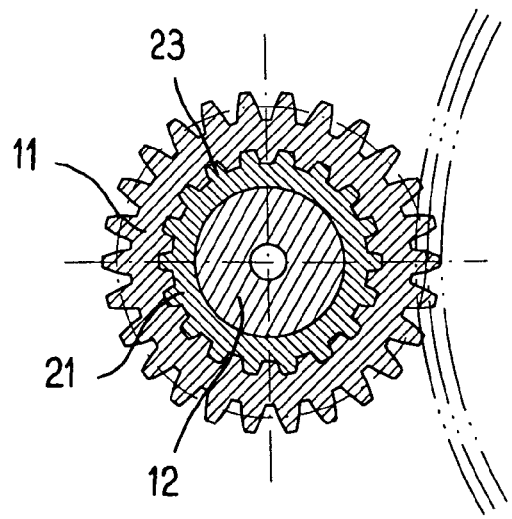
FIG. 4 is a fragmentary section view on line IV-IV of FIG. 3.

As can be seen in FIG. 4, the clutch 21 and the outlet pinion 11 present complementary fluting 23 such that when the clutch 21 is in the engaged position, the clutch 21 is constrained to rotate with the outlet pinion 11. Furthermore, the clutch 21 is constrained to rotate with the driver 12 by means of fingers 24 secured to the clutch 21 and extending through oblong slots 25 formed in the wall of the driver 12 to open out into a central cavity thereof, as can be seen more particularly in FIG. 5.

Figure 5:
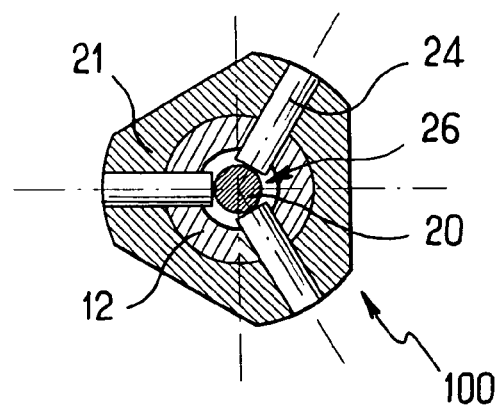
FIG. 5 is a section view on line V-V of FIG. 3 showing a portion of the coupling member in the coupled state.

As can be seen in FIG. 5, the ends of the fingers 24 are received in a groove 26 formed in the end of a control rod 20 of the coupling member 100 that extends in the central orifice of the driver 12 along the axis Z2. Sliding washers 27 are placed on the flanks of the groove 26. Axial displacement of the control rod 20 causes the clutch 21 to move axially in corresponding manner.

The control rod 20 is moved axially by an auxiliary electric motor 28 that is arranged to apply drive in one direction or the other to a control wheel 29 mounted to rotate on the electromechanical steering actuator about the axis Z2 and having a threaded end 30 that co-operates with complementary tapping in the control rod 20. The helical connection as organized in this way between the control wheel 29 and the control rod 20 allows rotation of the auxiliary electric motor 28 to cause the control rod 20 to move up or down, thereby moving the clutch 21 up or down. The control rod 20 is prevented from turning by fluting 31 co-operating with complementary fluting in the body of the actuator.

Figure 6:
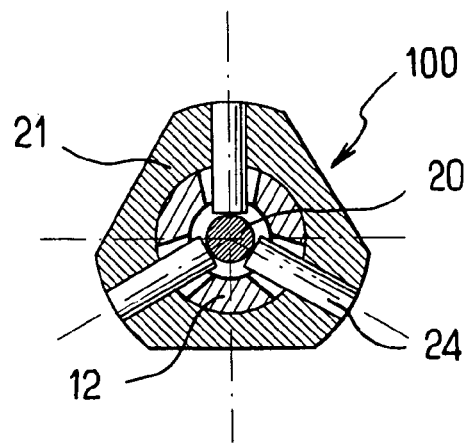
FIG. 6 is a section view on line VI-VI of FIG. 7.

As can be seen in FIG. 6, when the clutch 21 is in the release position, the oblong slots no longer match the width of the fingers 24 but they are slightly wider so that the fingers 24 and thus the clutch 21 have a small amount of freedom to turn relative to the driver 12, thus facilitating engagement of the fluting 23 when the clutch 21 returns towards the engaged position.

In order to determine the state of the coupling member 100, an indicator needle 40 is secured to the end of the control rod 20 and forms the core of an inductive position sensor 41 of the linear variable differential transformer (LVDT) type from which the output signal varies depending on the axial position of the needle 40 and thus of the clutch 21, thus making it possible to detect whether the clutch 21 is in the engaged or the release position.

It should be observed that when the clutch 21 is in the release position, deliberate or accidental rotation of the main electric motor 16 cannot lead to untimely engagement, so the released state is a stable state. Similarly, when the clutch 21 is in the engaged position, intentional or accidental rotation of the electric motor 16 cannot lead to untimely release, such that the engaged state is also a stable state.

A difficulty arises during engagement, if the ends of the fluting on the clutch 21 extend in register with the ends of the fluting on the outlet pinion 11. In order to avoid damaging the fluting, it is appropriate to stop the motor 28 quickly in order to avoid applying excessive pressure on the facing ends of the fluting.

The motor 28 is then reversed so as to separate the clutch 21 from the outlet pinion 11, and the outlet pinion 11 is caused to turn using the other electromechanical steering actuator which, by turning the toothed ring 7 causes the outlet pinion 11 of the released actuator to turn. Thus, the fluting of the clutch 21 can be brought out of register with the fluting in the outlet pinion 11 thus enabling the clutch 21 to penetrate easily into the outlet pinion 11.

Figure 8:
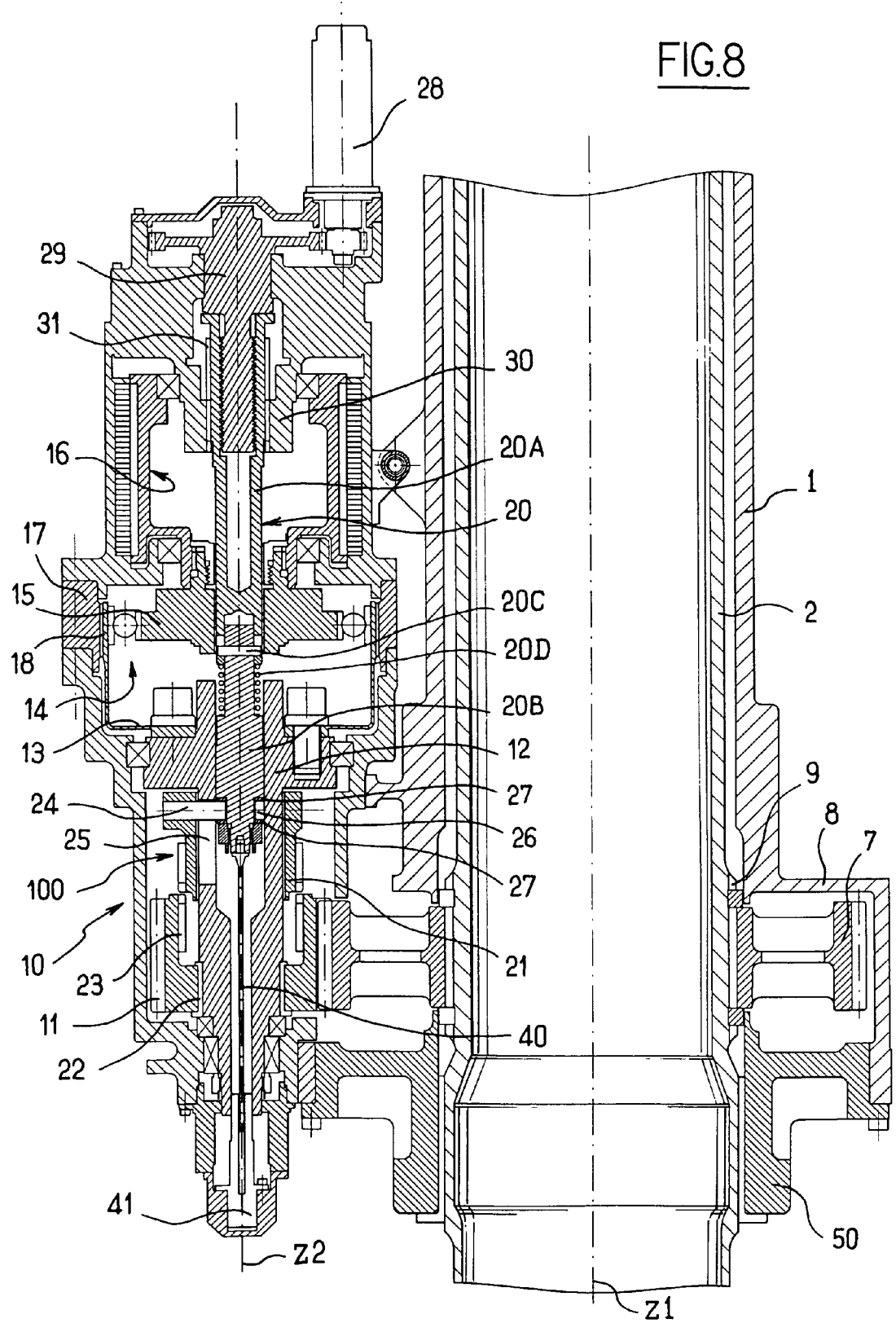
FIG. 8 is a section view analogous to FIG. 3 showing a variant embodiment.

In a variant shown in FIG. 8, the control rod 20 is no longer axially connected to the clutch 21 in direct manner. The rod 20 is subdivided into two elements 20A and 20B that are movable axially relative to each other so that the rod 20 can be shortened. For this purpose, the element 20B includes a pin 20C which is engaged in slots in the element 20A, a spring 20D keeping the elements 20A and 20B in a spaced-apart position.

In this example, the actuator is shown with the clutch 21 in the release position.

During engagement, rotation of the motor 28 causes the control wheel to turn, and thus causes the rod 20 and the clutch 21 to move axially. If the fluting of the clutch 21 is in register with the fluting of the outlet pinion 11, then the clutch 21 cannot engage in the outlet pinion 11. The clutch 21 and the element 20B are prevented from moving axially, which is easily identifiable by means of the sensor 41, with the element 20A continuing to move axially under drive from the rotating motor 28.

The spring 20D serves to absorb this difference in axial movement between the elements 20A and 20B, and avoids imparting a large pressure force on the ends of the fluting which could hammer their ends or even damage them.

In this situation, it suffices to cause the motor 28 to turn in the other direction so as to separate the clutch 21 from the outlet pinion 11, and then cause the outlet pinion to turn slightly by using the other electromechanical steering actuator which, by turning the toothed ring 7 causes the outlet pinion 11 of the released actuator to turn. Thus, the ends of the fluting on the clutch 21 and on the outlet pinion 11 are no longer in register and the clutch 21 can penetrate easily into the outlet pinion 11.

The use of such electromechanical steering actuators presents several advantages:
  in normal operation, both electromechanical steering actuators operate in parallel, thereby giving appreciable speed of response to the steering command;
  if one of the electromechanical steering actuators 10 breaks down, it can be decoupled, thus making it possible to avoid locking the position of the tube 2 in the event of the failed electromechanical steering actuator itself being prevented from rotating. Under such circumstances, and providing each of the electromechanical steering actuators is sufficiently powerful on its own to control steering, steering can continue to be provided using the healthy electromechanical steering actuator, even if that is at the cost of poorer steering performance;
  the ability to decouple makes it possible to test the electromechanical steering actuators after the undercarriage has been extended but prior to landing. In order to test the motor of each of the electromechanical steering actuators, it suffices to begin by causing decoupling to take place and then to turn the corresponding main motor. The motor must turn easily while being fed with low current, given that it is no longer connected to the toothed ring 7. Then in order to test the coupling member, it suffices to initiate coupling and verify that the motor needs much higher current in order to make it turn, corresponding to the resistance that is to be expected from the motor being coupled;

the ability to uncouple makes it possible to use large step-down ratios, which presents the advantage of enabling smaller motors to be used, but makes the actuators irreversible. Any drawback normally associated with irreversibility, which runs the risk of the entire steering control system becoming blocked in the event of one of the actuators failing, is overcome in this configuration because of the possibility to achieve uncoupling. It is then advantageous to provide for it to be possible for personnel on the ground to be able to achieve uncoupling so that this can be done while the aircraft is being towed and without damaging the electromechanical steering actuators;

the disposition of the electromechanical steering actuators of the invention makes it possible to implement maintenance of the line replaceable unit (LRU) type, which consists in identifying which electromechanical steering actuator is faulty, and then replacing the faulty electromechanical steering actuator and only that actuator with a new electromechanical steering actuator. In this configuration, it suffices to unplug various electric cables, to undo the screws fastening the electromechanical steering actuator, and to move the electromechanical steering actuator radially away from the undercarriage, without it being necessary to dismantle the other electromechanical steering actuator or any other structural portion of the undercarriage; and the electromechanical steering actuators make it possible in this configuration, given the way they co-operate with the toothed ring 7, to steer the bottom portion through 360° without any limit on its angular stroke.

In a particular aspect of the invention that can be seen in FIG. 3, the housing 8 at the bottom of the main fitting 1 is closed by a cover 50 that also forms a bearing for the turnable tube 2. This disposition makes it possible to clear access to the toothed ring 7 completely and enables the toothed ring 7 to be separated from the turnable tube 2, and thus allow it to be replaced. This disposition makes it possible to limit the diameter of the turnable tube in register with the bearing to a value that is slightly greater than the outside diameter of the fluting 9, thus enabling the turnable tube to be simple in shape.

The invention is not limited to the description above, but on the contrary covers any variant coming within the ambit defined by the claims.

In particular, although an undercarriage is shown that is fitted with two electromechanical steering actuators, it is possible to fit the undercarriage with a larger number of modular electromechanical steering actuators. It can thus be made possible for the modular electromechanical steering actuator to be dimensioned so that using two of them suffices for the needs of an aircraft of the A320 type, while for larger aircraft, e.g. of the A340 or A380 type, it is possible to continue using the same type of electromechanical steering actuator but in larger numbers so as to be capable of delivering higher levels of steering torque.

Finally, although the preferred arrangement of the electromechanical steering actuators of the invention is actuators that are in modular form and that are fitted releasably on the undercarriage, the invention also covers an undercarriage having electromechanical steering actuators of the invention that are integrated in the undercarriage.

What is claimed is:

1. An aircraft undercarriage comprising:
a steerable bottom portion, and
a steering member suitable for turning the steerable bottom portion in response to a steering order,
wherein the steering member comprises a plurality of electromechanical steering actuators each comprising at least one main electric motor,
wherein the actuators are disposed on the undercarriage so as to enable all of them said actuators to co-operate simultaneously with the steerable bottom portion in order to steer said bottom portion, and
wherein each of the electromechanical steering actuators includes a controllable coupling means for selectively placing the actuator:
either in a coupled state in which said actuator is coupled with the steerable bottom portion, in which the main electric motor of the actuator is suitable for causing the steerable bottom portion to turn; or
in an uncoupled state in which said actuator is uncoupled from the steerable bottom portion and in which the main electric motor of the actuator is isolated from the steerable bottom portion.

2. An undercarriage according to claim 1, in which each of the electromechanical steering actuators includes an outlet pinion, said pinion being rotated by the associated main electric motor when the actuator is in the coupled state, and
the steerable bottom portion of the under-carriage has a common toothed ring,
wherein the outlet pinions of all of the electromechanical steering actuators cooperate with said common toothed ring secured to the steerable bottom portion of the undercarriage.

3. An undercarriage according to claim 2, in which the coupling means are arranged to make or break a rotary mechanical connection between the outlet pinion and the main electric motor.

4. An undercarriage according to claim 3, in which each electromechanical steering actuator includes a gearbox disposed between the main motor and the outlet pinion, the coupling means being disposed between the outlet pinion and an outlet member of the gearbox.

5. An undercarriage according to claim 4, in which the gearbox is of the type having a deformable circular wall.

6. An undercarriage according to claim 1, in which each of the electro-mechanical steering actuators is modular and can be separably fitted to the undercarriage.

7. An undercarriage according to claim 6, in which the electro-mechanical steering actuators are disposed on the undercarriage and are structured to permit removal of an electromechanical steering actuator without removing any other electromechanical steering actuator or any structural portion of the undercarriage.

8. A method of testing an undercarriage according to claim 1, in which one of the electromechanical steering actuators is placed in the uncoupled state and the main electric motor of said actuator is powered in order to verify that it rotates while drawing less electric current than in a coupled state.

9. A method according to claim 8, implemented while the undercarriage is mounted on an aircraft.

* * * * *